(12) United States Patent
Cobler (10) Patent No.: US 9,546,277 B2
(45) Date of Patent: *Jan. 17, 2017

(54) THERMOPLASTIC FILMS AND BAGS (71) Applicant: Poly-America, L.P., Grand Prairie, TX (US)

(72) Inventor: Brad A. Cobler, Irving, TX (US)

(73) Assignee: Poly-America, L.P., Grand Prairie, TX (US)

( * ) Notice: Subject to any disclaimer, the term of this patent is extended or adjusted under 35 U.S.C. 154(b) by 123 days.

This patent is subject to a terminal disclaimer.

(21) Appl. No.: 14/664,978

(22) Filed: Mar. 23, 2015

(65) Prior Publication Data

US 2015/0191599 A1 Jul. 9, 2015

Related U.S. Application Data (63) Continuation-in-part of application No. 14/061,820, filed on Oct. 24, 2013, now Pat. No. 9,290,303.

(51) Int. Cl.
| | | |
|---|---|---|
| *C08L 101/12* | (2006.01) | |
| *B29D 7/01* | (2006.01) | |
| *B65D 33/00* | (2006.01) | |
| *B65D 65/38* | (2006.01) | |
| *B65D 81/03* | (2006.01) | |
| *B29C 59/02* | (2006.01) | |

(52) U.S. Cl.
CPC .............. *C08L 101/12* (2013.01); *B29D 7/01* (2013.01); *B65D 33/00* (2013.01); *B65D 65/38* (2013.01); *B65D 81/03* (2013.01); *B29C 59/022* (2013.01); *Y10T 428/1345* (2015.01); *Y10T 428/2457* (2015.01); *Y10T 428/24587* (2015.01)

(58) Field of Classification Search
CPC .............. C08L 101/12; Y10T 428/1345; Y10T 428/2457; Y10T 428/24587; B29D 7/01; B29D 59/022; B65D 33/00; B65D 65/38; B65D 81/03

See application file for complete search history.

(56) References Cited

U.S. PATENT DOCUMENTS

| | | |
|---|---|---|
| 3,542,634 A | 11/1970 | John et al. |
| 3,894,352 A | 7/1975 | Hooker |
| 4,609,518 A | 9/1986 | Curro et al. |
| 4,640,859 A | 2/1987 | Hansen et al. |
| 5,034,078 A | 7/1991 | Hodgson, Jr. et al. |
| 5,205,650 A | 4/1993 | Rasmussen |
| 5,296,184 A | 3/1994 | Wu et al. |
| 5,518,801 A | 5/1996 | Chappell et al. |
| 5,968,029 A | 10/1999 | Chappell et al. |
| D419,780 S | 2/2000 | Funk et al. |
| D430,734 S | 9/2000 | Bredendick et al. |
| 6,150,647 A | 11/2000 | Anderson et al. |
| D436,738 S | 1/2001 | Bredendick et al. |

(Continued)

*Primary Examiner* — Michael C Miggins
(74) *Attorney, Agent, or Firm* — Daniel J. Layden; Brandon J. Lee (57) ABSTRACT

The present invention relates to a thermoplastic film having improved tear and puncture resistance. The thermoplastic film has a plurality of embossed regions that are comprised of a plurality of parallel, linear embosses. The plurality of embossed regions is arranged so that a straight line cannot traverse the thermoplastic film without intersecting at least one of the plurality of embossed regions. Certain embodiments further disclose an unembossed arrangement having at least three distinct segments that extend in three distinct directions.

20 Claims, 10 Drawing Sheets (56) References Cited

U.S. PATENT DOCUMENTS

| | | |
|---|---|---|
| D440,051 S | 4/2001 | Bredendick et al. |
| D443,766 S | 6/2001 | Bredendick et al. |
| 6,266,820 B1 | 7/2001 | Gupta et al. |
| 6,363,530 B1 | 4/2002 | Lampson et al. |
| 6,394,651 B2 | 5/2002 | Jackson |
| 6,394,652 B2 | 5/2002 | Meyer et al. |
| 6,458,447 B1 | 10/2002 | Cabell et al. |
| 6,513,975 B1 | 2/2003 | Jackson et al. |
| 6,670,521 B2 | 12/2003 | Noda et al. |
| 6,911,243 B2 | 6/2005 | Sher et al. |
| D518,648 S | 4/2006 | Broering et al. |
| 7,108,440 B1 | 9/2006 | Gruenbacher et al. |
| 7,250,210 B2 | 7/2007 | Mazurek et al. |
| 7,445,831 B2 | 11/2008 | Ashraf et al. |
| 7,838,725 B2 | 11/2010 | Noda et al. |
| 7,896,641 B2 | 3/2011 | Qureshi et al. |
| 7,902,420 B2 | 3/2011 | Kase |
| 7,938,635 B2 | 5/2011 | Heilman et al. |
| 7,942,577 B2 | 5/2011 | Fraser et al. |
| 8,303,294 B2 | 11/2012 | Qureshi et al. |
| 8,343,411 B2 | 1/2013 | Arora et al. |
| D690,117 S | 9/2013 | Haverfield et al. |
| 8,541,642 B2 | 9/2013 | Anderson et al. |
| D691,815 S | 10/2013 | Haverfield et al. |
| D691,816 S | 10/2013 | Haverfield et al. |
| 8,794,835 B2 | 8/2014 | Wilcoxen et al. |
| 8,876,382 B2 | 11/2014 | Wilcoxen et al. |
| 8,940,377 B2 | 1/2015 | Fraser et al. |
| D725,915 S | 4/2015 | Haverfield et al. |
| D725,916 S | 4/2015 | Haverfield et al. |
| 8,997,672 B2 | 4/2015 | Brennan et al. |
| 9,016,945 B2 | 4/2015 | Fraser et al. |
| 9,028,386 B2 | 5/2015 | Fraser et al. |
| 9,090,018 B2 | 7/2015 | Rasmussen |
| 9,108,390 B2 | 8/2015 | Borchardt |
| 9,114,596 B2 | 8/2015 | Macpherson et al. |
| 9,132,602 B2 | 9/2015 | Rasmussen |
| 9,132,938 B2 | 9/2015 | Tucker et al. |
| 9,132,956 B2 | 9/2015 | Wilcoxen et al. |
| 9,186,862 B2 | 11/2015 | Broering et al. |
| 9,216,538 B2 | 12/2015 | Borchardt |
| 9,220,638 B2 | 12/2015 | Hammons et al. |
| D748,990 S | 2/2016 | Cisek et al. |
| 9,254,061 B2 | 2/2016 | Harl et al. |
| D750,404 S | 3/2016 | Cisek et al. |
| D750,499 S | 3/2016 | Cisek et al. |
| 9,272,461 B2 | 3/2016 | Maxwell |
| 2003/0207640 A1 | 11/2003 | Anderson et al. |
| 2004/0137200 A1 | 7/2004 | Chhabra et al. |
| 2006/0093766 A1 | 5/2006 | Savicki et al. |
| 2008/0228159 A1 | 9/2008 | Anderson et al. |
| 2008/0253699 A1 | 10/2008 | Hall |
| 2009/0094943 A1 | 4/2009 | Heilman et al. |
| 2010/0040875 A1 | 2/2010 | Patel et al. |
| 2010/0119755 A1 | 5/2010 | Chung et al. |
| 2010/0266222 A1 | 10/2010 | Rusnak et al. |
| 2012/0134606 A1 | 5/2012 | Borchardt et al. |
| 2012/0269466 A1 | 10/2012 | Dorsey et al. |
| 2013/0243982 A1 | 9/2013 | Borchardt et al. |
| 2015/0003757 A1 | 1/2015 | Wilcoxen et al. |
| 2015/0030266 A1 | 1/2015 | Borchardt |
| 2015/0036951 A1 | 2/2015 | Fraser et al. |
| 2015/0071574 A1 | 3/2015 | Fraser et al. |
| 2015/0104121 A1 | 4/2015 | Broering et al. |
| 2015/0298862 A1 | 10/2015 | Borchardt et al. |
| 2015/0321461 A1 | 11/2015 | Macpherson et al. |
| 2016/0039169 A1 | 2/2016 | Broering et al. |
| 2016/0046110 A1 | 2/2016 | Broering et al. |
| 2016/0046411 A1 | 2/2016 | Kent et al. |

THERMOPLASTIC FILMS AND BAGS

CROSS-REFERENCE TO RELATED APPLICATIONS

This application is a continuation-in-part of application Ser. No. 14/061,820, filed Oct. 24, 2013, now U.S. Pat. No. 9,290,303, and is hereby incorporated by reference into this disclosure.

BACKGROUND OF THE INVENTION

1. Field of the Invention

The present invention relates to improvements for thermoplastic films, particularly thermoplastic films used in the manufacture of bags including trash bags. In particular, the present invention relates to improvements to trash bags and embossed patterns for such bags.

2. Description of the Related Art

Thermoplastic films are used in a variety of applications. For example, thermoplastic films are used in sheet form for applications such as drop cloths, vapor barriers, and protective covers. Thermoplastic films can also be converted into plastic bags, which may be used in a myriad of applications. The present invention is particularly useful to trash bags constructed from thermoplastic film, but the concept and ideas described herein may be applied to other types of thermoplastic films and bags as well.

Plastic bags are manufactured from thermoplastic film produced using one of several manufacturing techniques well-known in the art. The two most common methods for manufacture of thermoplastic films are blown-film extrusion and cast-film extrusion. In blown-film extrusion, the resulting film is tubular while cast-film extrusion produces a generally planar film.

In blown film extrusion, thermoplastic resin is fed into an extruder where an extrusion screw pushes the resin through the extruder. The extrusion screw compresses the resin, heating the resin into a molten state under high pressure. The molten, pressurized resin is fed through a blown film extrusion die having an annular opening. As the molten material is pushed into and through the extrusion die, a thermoplastic film tube emerges from the outlet of the extrusion die. The direction that the thermoplastic film tube is extruded from the extrusion die is commonly referred to as the machine direction. The direction perpendicular to the machine direction is commonly referred to as the cross direction.

Depending on the application, the use of thermoplastic film presents technical challenges since thermoplastic film is inherently soft and flexible. Specifically, all thermoplastic films are susceptible to puncture and tear propagation. In some instances, it may be possible to increase the thickness of the film or select better polymers to enhance the physical properties of the film. However, these measures increase both the weight and cost of the thermoplastic film and may not be practicable. In light of the technical challenges of thermoplastic film, techniques and solutions have been developed to address the need for improved shock absorption to reduce the likelihood of puncture. For example, it is known to impart stretched areas into thermoplastic films as a means of inducing shock absorption properties into the film.

U.S. Pat. No. 5,205,650, issued to Rasmussen and entitled Tubular Bag with Shock Absorber Band Tube for Making Such Bag, and Method for its Production, discloses using thermoplastic film material with stretchable zones wherein the film material has been stretched in a particular direction with adjacent un-stretched zones that extend in substantially the same direction. The combination of the stretched zones and adjacent un-stretched zones provides a shock absorber band intended to absorb energy when the bag is dropped. Specifically, when a bag is dropped or moved, the contents inside the bag exert additional forces that would otherwise puncture or penetrate the thermoplastic film. However, the shock absorber bands absorb some of the energy and may prevent puncture of the film.

Another example of a thermoplastic film material designed to resist puncture is disclosed in U.S. Pat. No. 5,518,801, issued to Chappell and entitled Web Materials Exhibiting Elastic-Like Behavior. Chappell, in the aforementioned patent and other related patents, discloses using a plurality of ribs to provide stretchable areas in the film much like Rasmussen. Chappell also discloses methods of manufacturing such thermoplastic film with such ribs.

Another example of shock absorption to prevent puncture is disclosed in U.S. Pat. No. 5,650,214 issued to Anderson and entitled Web Materials Exhibiting Elastic-Like Behavior and Soft Cloth-Like Texture. Anderson discloses using a plurality of embossed ribs defining diamond-shaped areas with a network of unembossed material between the diamond-shaped areas. Thus, the unembossed area comprises a network of straight, linear unembossed material extending in two perpendicular directions.

The foregoing disclosures specifically address the desire to increase the shock absorption of thermoplastic film to reduce the likelihood of punctures occurring in the film. However, none of the foregoing disclosures address the problem of reducing tear propagation in a thermoplastic bag.

Previously known solutions to limiting tear propagation are based on two primary concepts. First, longer and more tortuous tear paths consume more energy as the tear propagates and can help in limiting the impact of the tear in a bag or thermoplastic film. Second, many thermoplastic films, particularly thermoplastic films made using a blown-film extrusion process, have different physical properties along different axes of the film. In particular, blown films are known to have higher tear strength in the cross-direction versus the corresponding tear strength in the machine direction. Certain prior art solutions take advantage of the differential properties of thermoplastic films by redirecting tears into a different direction. This redirecting of tears can offer greater resistance to a tear propagating. For example, some solutions redirect a tear propagating in the weaker machine direction of blown film into the stronger cross-direction.

One solution for reducing tear propagation is based on the idea that longer, tortuous tear paths are preferable and is described in U.S. Pat. No. 6,824,856, issued to Jones and entitled Protective Packaging Sheet. Jones discloses materials suitable for packaging heavy loads by providing an embossed packaging sheet with improved mechanical properties. Specifically, a protective packaging sheet is disclosed where surfaces of the sheet material are provided with protuberances disposed therein with gaps between protuberances. The protuberances are arranged such that straight lines necessarily intersect one or more of the protuberances. The resulting protective packaging sheet provides mechanical properties where tears propagating across the thermoplastic sheet are subject to a tortuous path. The tortuous path is longer, and more complex, than a straight-line tear, and a tear propagating along such a path would require markedly more energy for continued propagation across the film compared to a tear along a similar non-tortuous path in the same direction. Thus, due to the increased energy required for tear propagation, the tortuous path ultimately reduces the impact of any tears that do propagate across the film.

Another example of a tear resistant plastic film is disclosed in U.S. Pat. No. 8,357,440, issued to Hall and entitled Apparatus and Method for Enhanced Tear Resistance Plastic Sheets. Hall discloses an alternative tortuous path solution and further relies on the fact discussed above that certain polymer films, particularly thermoplastic films made in a blown-film extrusion process, are known to have a stronger resistance to tear in the cross direction when compared to the machine direction.

Hall discloses a solution that contemplates using preferably shaped embosses, particularly convex shaped embosses with a curved outer boundary, to provide maximum resistance to tear propagation. In most thermoplastic films, a tear will have a tendency to propagate along the path of least resistance or in the machine direction. Hall contemplates redirecting propagating tears in a tortuous path with the additional intent of redirecting the machine direction tears along the curved edges of the embossed regions and into a cross direction orientation. The redirected tears in the cross direction will be subject to additional resistance and, preferably, will propagate to a lesser degree than a tear propagating in the machine direction in an unembossed film.

Unlike the references described earlier, Jones and Hall are primarily focused on resistance to tear propagation after a puncture has occurred, rather than attempting to prevent the puncture from occurring in the first place. It would be desirable to balance both of these properties, shock absorption and tortuous tear paths in the cross direction, into a single, practicable thermoplastic film. Specifically, it would be desirable to provide a thermoplastic film with a shock-absorbing feature to prevent punctures in a film while also providing increased resistance to tear propagation. It would also be desirable to balance these features so that one feature does not degrade the performance of another. The present invention addresses these needs.

SUMMARY OF THE PRESENT INVENTION

In at least one embodiment of the present invention, an embossed pattern of thermoplastic film may have a plurality of embossed regions embossed into the thermoplastic film. Each of the plurality of embossed regions may comprise a set of parallel, linear embosses. In at least one embodiment, each of the plurality of embossed regions may comprise six or more parallel linear embosses. The plurality of embossed regions may be separated by a continuous, unembossed arrangement. Each embossed region may be defined by a boundary with the continuous, unembossed arrangement. The continuous, unembossed arrangement may comprise at least a plurality of first segments, a plurality of second segments, and a plurality of third segments. The plurality of first segments may extend in a first direction and the first direction may be vertical. The plurality of second segments may extend in a second direction. The plurality of third segments may extend in a third direction. The first, second, and third directions may each be distinct from each other. Additionally, the first, second and third directions may each be oblique to each other. The first, second, and third segments may intersect each other. The first, second, and third segments may also intersect each other at two opposing vertices of each embossed region.

In some embodiments of the present invention, each emboss of each set of parallel, linear embosses of an embossed region may be parallel with every other emboss of parallel linear embosses of other embossed regions. Furthermore, in some embodiments, a majority of the plurality of embossed regions may be irregularly shape. In the alternative, a majority of the plurality of embossed regions may be hexagon-shaped.

In another embodiment of the present invention, a thermoplastic bag may have a first panel and a second panel. The first panel and second panel may be joined along a first side edge, a second side edge, and a bottom edge. A top edge of the first panel and the second panel may define an upper opening of the bag. A plurality of embossed regions may be embossed into the first panel and the second panel. A majority of the plurality of embossed regions may be irregularly shape. In the alternative, a majority of the plurality of embossed regions may be hexagon-shaped. The plurality of embossed regions may be separated by a continuous, unembossed arrangement. Each of the plurality of embossed regions may comprise a plurality of parallel, linear embosses. In at least one embodiment, each of the plurality of embossed regions may comprise six or more parallel, linear embosses. Each emboss of each set of parallel, linear embosses of an embossed region may be parallel with every other emboss of parallel linear embosses of other embossed regions. Each embossed region may be defined by the continuous, unembossed arrangement. The continuous, unembossed arrangement may comprise at least a plurality of first segments, a plurality of second segments, and a plurality of third segments. The plurality of first segments may extend in a first direction. The plurality of second segments may extend in a second direction. The plurality of third segments may extend in a third direction. The first, second, and third directions may be distinct from each other. Additionally, the first, second and third directions may each be oblique to each other. The first, second, and third segments may intersect each other. The first, second, and third segments may also intersect each other at two opposing vertices of each embossed region.

In a further embodiment of the present invention, an embossed pattern of thermoplastic film includes a plurality of embossed regions embossed into thermoplastic film. Each of the plurality of embossed regions may include a set of parallel, linear embosses. The plurality of embossed regions may be separated by a continuous, unembossed arrangement. Each of the plurality of embossed regions may also have a serpentine shape. The continuous, unembossed arrangement may only bound each embossed region at a perimeter of the embossed pattern. Each embossed region may be defined by a boundary with the continuous, unembossed arrangement. The continuous, unembossed arrangement may include a plurality of first segments, a plurality of second segments, a plurality of third segments, and a plurality of fourth segments. The plurality of first segments may extend in a first direction. The plurality of second segments may extend in a second direction. The plurality of third segments may extend in a third direction. The plurality of fourth segments may extend in a fourth direction. The first, second, third and fourth directions may be distinct from each other. The first direction may be generally vertical and the fourth direction may be generally horizontal.

BRIEF DESCRIPTION OF THE RELATED DRAWINGS

A full and complete understanding of the present invention may be obtained by reference to the detailed description of the present invention and certain embodiments when viewed with reference to the accompanying drawings. The drawings can be briefly described as follows.

DETAILED DESCRIPTION OF THE INVENTION

The present disclosure illustrates several embodiments of the present invention. It is not intended to provide an illustration or encompass all embodiments contemplated by the present invention. In view of the disclosure of the present invention contained herein, a person having ordinary skill in the art will recognize that innumerable modifications and insubstantial changes may be incorporated or otherwise included within the present invention without diverging from the spirit of the invention. Therefore, it is understood that the present invention is not limited to those embodiments disclosed herein. The appended claims are intended to more fully and accurately encompass the invention to the fullest extent possible, but it is fully appreciated that certain limitations on the use of particular terms are not intended to conclusively limit the scope of protection.

Figure 1:
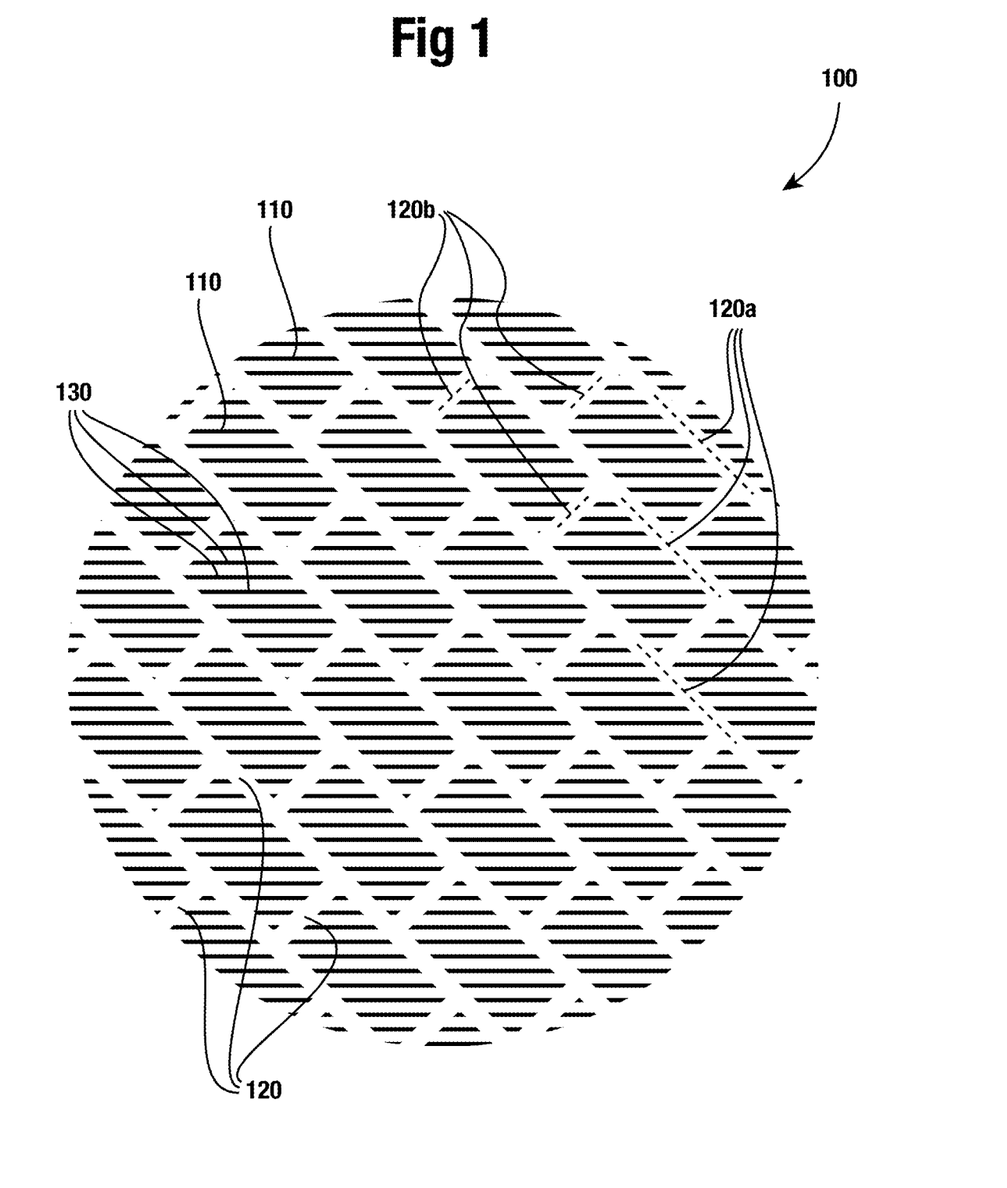
FIG. 1 provides a plan view of a first embodiment of the present invention.

Referring initially to FIG. 1, a plan view of a first embodiment of the present invention is shown. In particular, an embossed pattern 100 may be defined on a thermoplastic film. The embossed pattern 100 comprises a plurality of embossed regions 110, where each of the plurality of embossed regions 110 is separated by a continuous, unembossed arrangement 120. Each of the embossed regions 110 comprises a plurality of parallel linear embosses 130. The parallel, linear embosses 130 are all arranged in a parallel fashion throughout the embossed pattern 100 to facilitate expansion of the film in a particular direction. Furthermore, the parallel, linear embosses 130 extend across each embossed region 110. For ease of reference, a horizontal direction may be defined that is parallel with the linear embosses 130 and a vertical direction that is perpendicular to the linear embosses 130.

FIG. 1 further shows that the unembossed arrangement 120 includes a plurality of first segments 120a, and a plurality of second segments 120b. Each first segment 120a extends in a first direction. Each second segment 120b extends in a second direction that is generally perpendicular to the first direction. Due to the rectangular shape of each embossed region 110, each first segment 120a extends uninterrupted through the entire embossed pattern 100 while each second segment 120b is interrupted by adjacent embossed regions 110 and fails to extend through the embossed pattern 100.

In certain preferred embodiments of the present invention, the embossed regions 110 are provided with rounded corners, rather than sharp corners. As discussed with respect to the prior art, it is known that tears have a tendency to propagate along the edges of the embossed regions. Embossed regions with continuously curved borders, i.e. without sharp corners, encourage propagating tears to follow the edge of the embossed region. In contrast, when an embossed region is provided with sharp corners, the tear is more likely to diverge from the edge of the embossed region and will no longer be guided by the embossed region. Typically, such tears will continue propagating in the same direction, which may provide less resistance along a less tortuous path.

The present invention builds on the concepts of tortuous path and redirecting tears in a direction that provides more resistance to continued propagation of the tear by preferably utilizing rounded corners on the embossed regions. Preferably, the embossed regions 110 have generally rounded corners rather than sharp corners to facilitate redirection of tears propagating along the perimeter of said embossed region and into a more tortuous path that may offer increased tear resistance.

Figure 2:
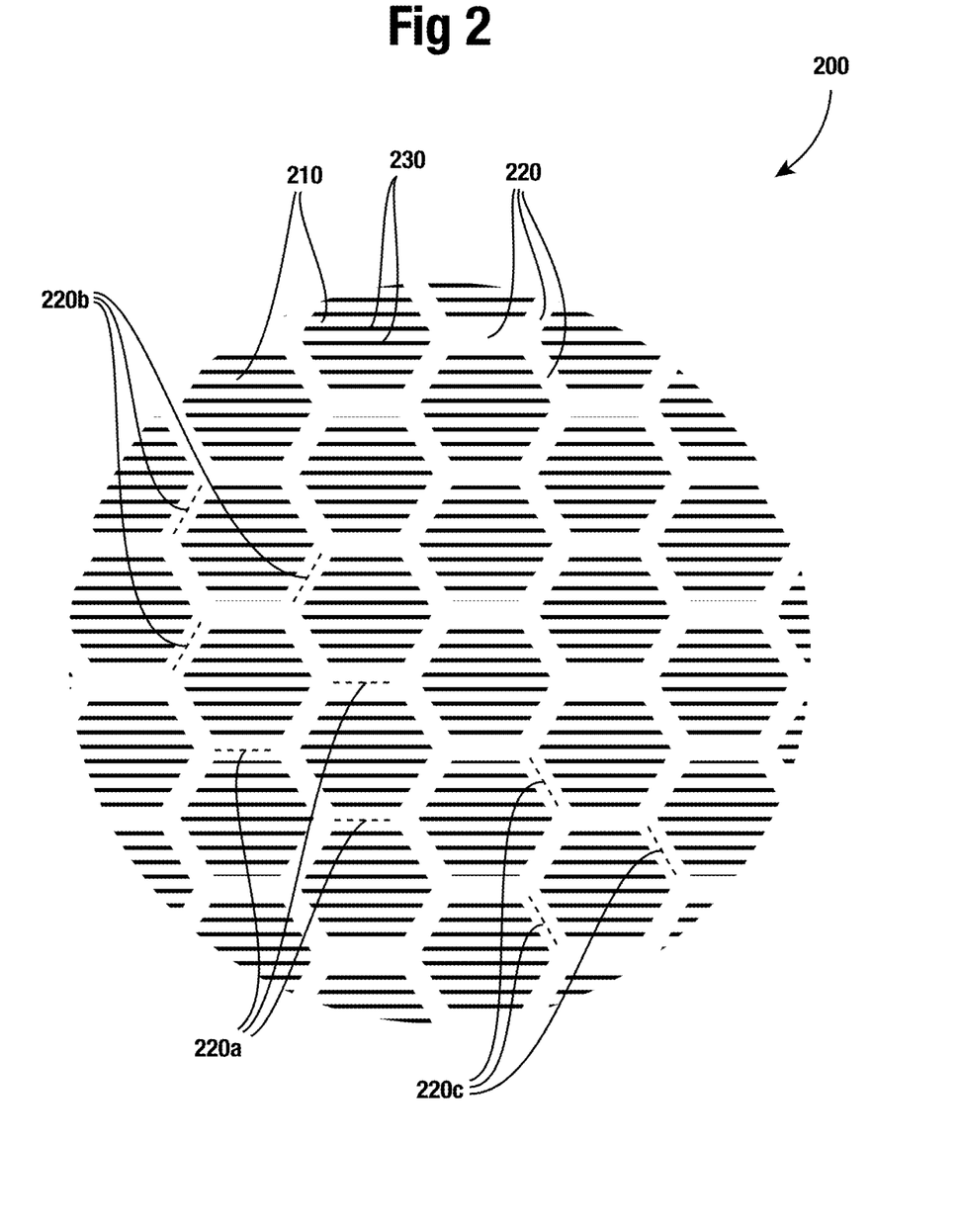
FIG. 2 provides a plan view of a second embodiment of the present invention.

FIG. 2 shows a second embodiment of the present invention. In this embodiment, the embossed pattern 200 has a plurality of embossed regions 210 that are generally hexagonal in shape, preferably with rounded corners to facilitate tear redirection. Like the previous embodiment, the embossed regions 210 have a plurality of parallel linear embosses 230. Moreover, due to the hexagonal geometry, the continuous, unembossed arrangement 220 does not provide any location where a continuous, straight line can be drawn across the arrangement 220, unlike the first embossed pattern 100 shown in FIG. 1. This is important because a tear propagating in the unembossed arrangement 220 cannot follow a continuous path in the machine direction, where the film is inherently weaker. Instead, assuming the tear follows the edges of the embossed regions 210, the tear will follow a longer path that will be, at least partially, in the cross direction.

Due to the hexagonal shape of the second embodiment, FIG. 2 further shows that the unembossed arrangement 220 includes a plurality of first segments 220a, a plurality of second segments 220b, and a plurality of third segments 220c. Dashed lines are provided in FIG. 2, as well as in many of the following figures, to indicate the direction that each segment extends. These dashed lines are provided for reference only and do not form any structure of the invention. Each first segment 220a extends in a first direction that is generally horizontal. Each second segment 220b extends in a second direction that is oblique (i.e. neither parallel nor at a right angle) to the first direction. Each third segment 220c extends in a third direction that is oblique to both the first direction and the second direction. Due to the hexagonal shape and nesting of adjacent embossed regions 210, none of the unembossed arrangement 220 segments 220a, 220b, or 220c extends through the embossed pattern 200; rather each segment is interrupted by an adjacent embossed region 210, extending only a fraction of one of the embossed regions 210.

Figure 3:
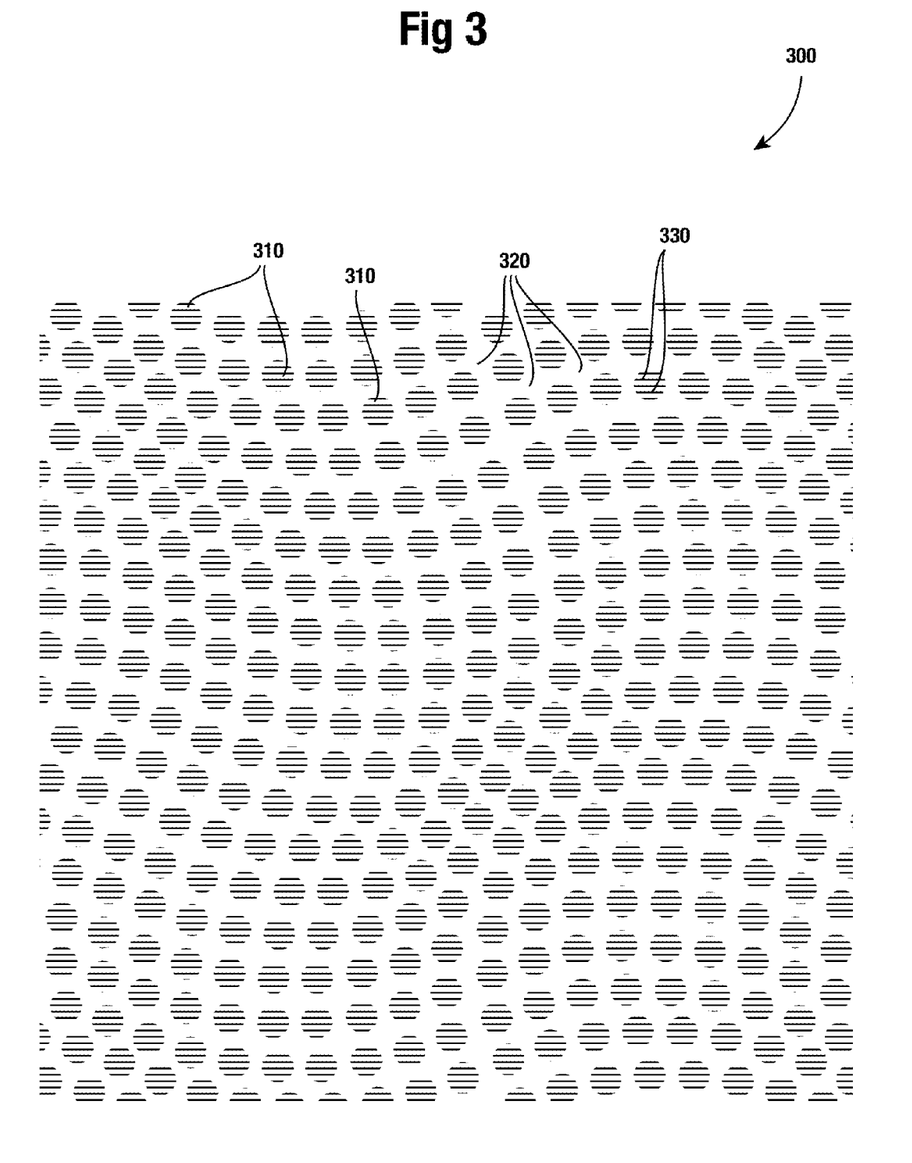
FIG. 3 provides a plan view of a third embodiment of the present invention.

FIG. 3 shows a third embodiment of the present invention. In this third embodiment, an embossed pattern 300, which may be applied to thermoplastic film, has a variety of circular embossed regions 310 arranged along a series of parallel sinusoidal paths separated by a continuous, unembossed arrangement 320. This continuous unembossed arrangement 320 offers unique advantages in that a continuous straight-line path is generally not possible, assuming the size of the embossed regions 310 are properly sized, the amplitude of the sinusoidal path is sufficiently large, and there is sufficient frequency of the embossed regions 310 along the sinusoidal path. Thus, as a tear propagates across the film, it will necessarily intersect with one of the embossed regions 310. Such tears will have a tendency to propagate around the edges of the embossed regions 310 and into varying directions.

In the embodiment disclosed in FIG. 3, the embossed regions 310 are preferably arranged along a series of parallel, sinusoidal paths extending in a first direction. The peak amplitude, measured from the center of the sinusoidal wave to the peak of the sinusoidal wave is typically at least ½ of the diameter of the embossed regions 310. In some embodiments of the present invention, the embossed regions 310 are also arranged along a sinusoidal path extending in a second direction. The second direction may be perpendicular to the first direction of the sinusoidal path.

In a preferred embodiment, the embossed regions 310 will all be substantially the same size. However, in other embodiments, the size of the embossed regions 310 may vary. For example, depending on the spacing between nearby embossed regions 310, the size, or even the shapes, of the embossed regions may be modified to provide that spacing between the embossed regions is more uniform.

Figure 4:
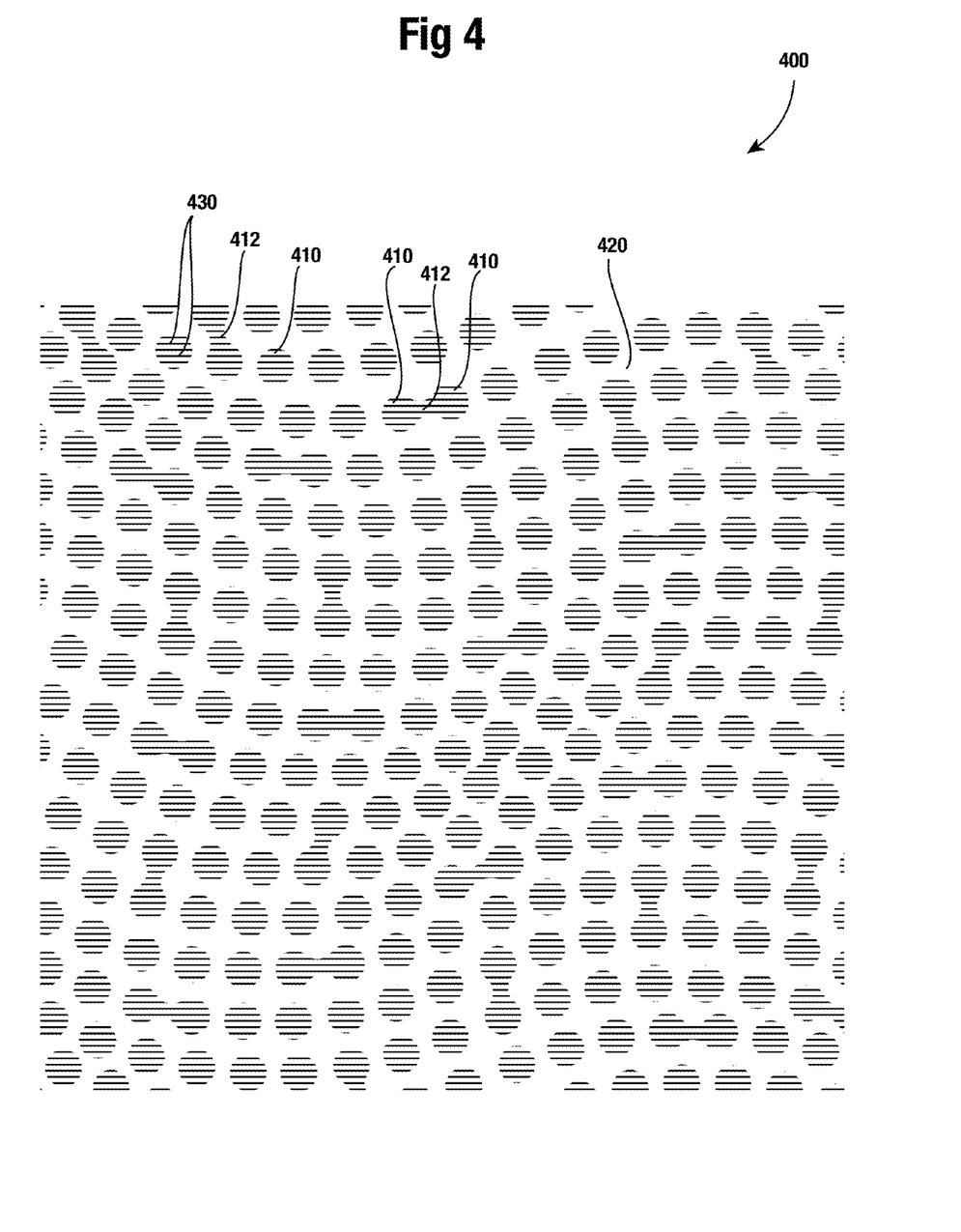
FIG. 4 provides a plan view of a fourth embodiment of the present invention.

FIG. 4 discloses a fourth embodiment of the present invention. In this embodiment, an embossed pattern 400 has a plurality of circular embossed regions 410 much like the embodiment depicted in FIG. 3. However, in this embodiment, some of the circular embosses are connected to form connecting embossed regions 412 to block some, or even all, of the sinusoidal paths between the circular embosses.

Looking back at FIG. 3, it is apparent that, depending on the size of the embossed regions 412 and the amplitude of the sinusoidal path of embossed regions 412, a tear may propagate along a sinusoidal path between the sinusoidal paths of the embossed regions 412. Properly selecting the amplitude of the sinusoidal waves, adjusting the location of the embossed regions 412 along the sinusoidal path, and modifying the sizes of the various embossed regions may be used, individually or in combination with one another, to prevent tears from propagating along the sinusoidal paths by forcing tears to continually encounter embossed regions 412 and propagate around the perimeter of said embossed regions 412

Figure 5:
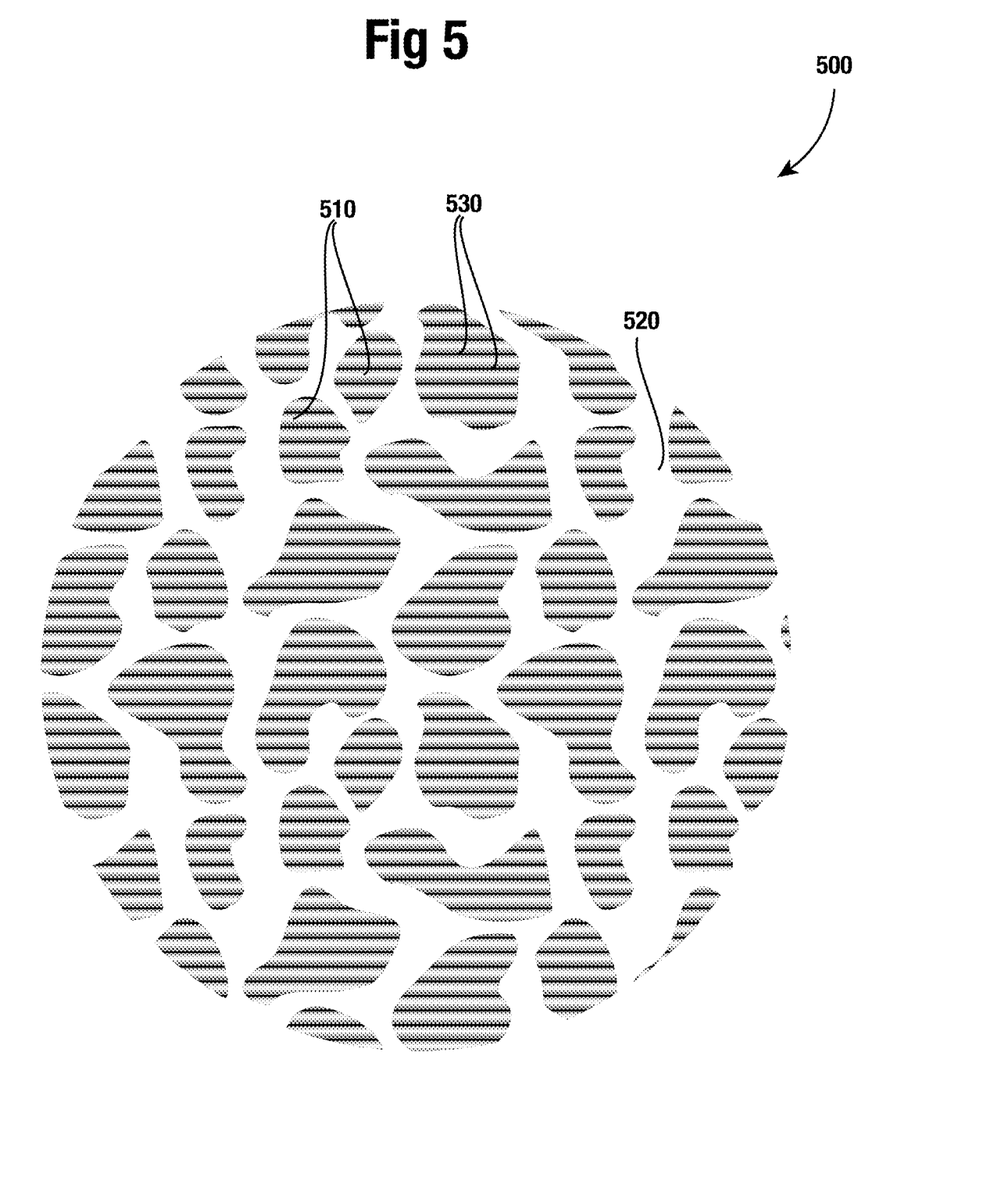
FIG. 5 provides a plan view of a fifth embodiment of the present invention.

Looking now at FIG. 5, a fifth embodiment of the present invention is depicted wherein the embossed regions are random shapes with substantially curved edges. The embossed pattern 500 is shown with a plurality of embossed regions 510, an unembossed arrangement 520, and each embossed region 510 comprised of a plurality of parallel linear embosses 530. The embossed pattern is structured so that a continuous, linear path cannot be drawn across the unembossed arrangement, which is desirable to prevent the propagation of tears across the thermoplastic film.

It has been observed that certain features of embossed regions are desirable to maximize the amount an embossed film expands due to an applied force. For instance, to maximize film expansion along a vertical axis, embossed regions having a polygonal shape with vertices at the bottom and top of the polygon is desirable. To also maximize expansion, a major axis of each of the plurality of linear embosses should be arranged perpendicular to the vertical axis.

Figure 6:
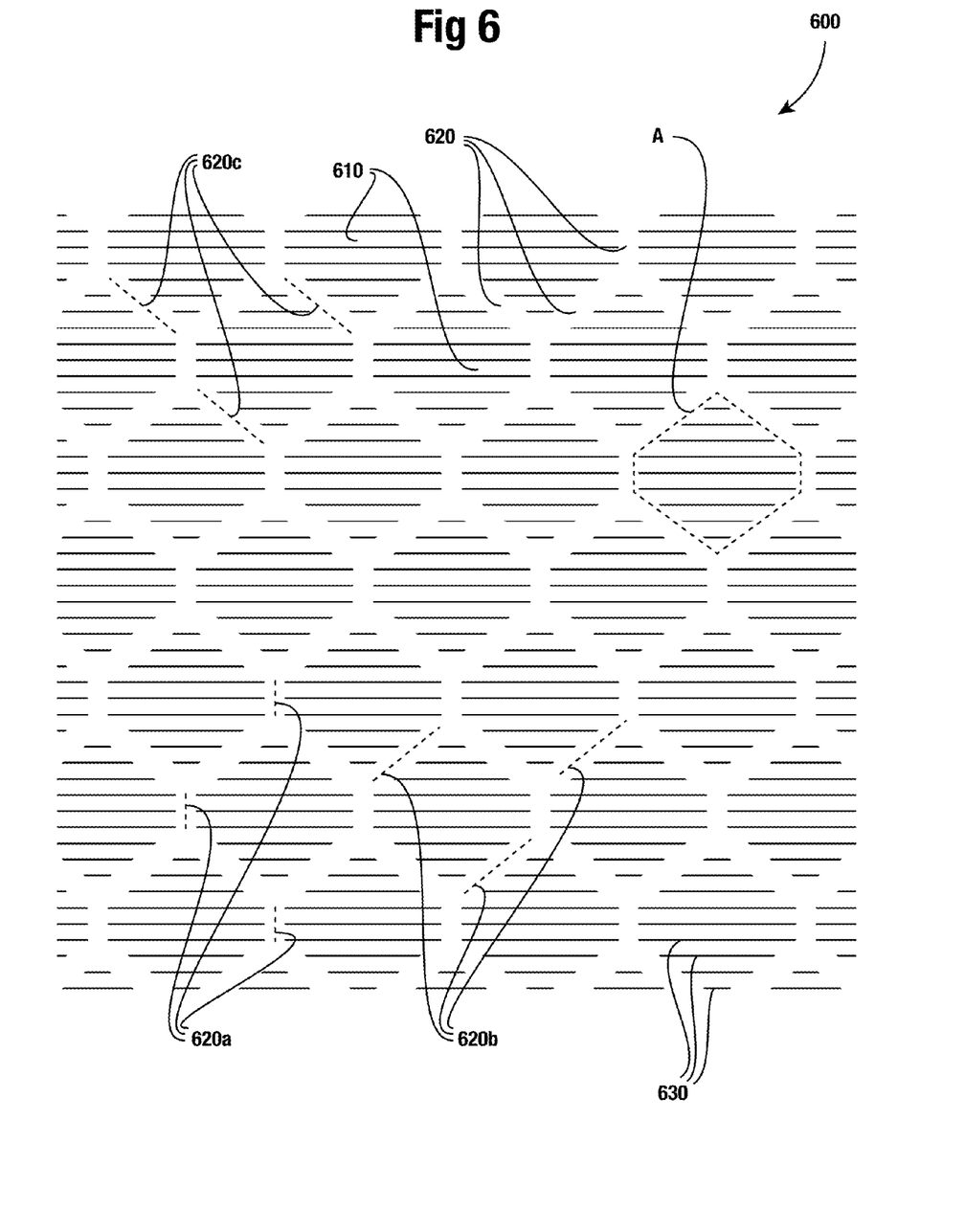
FIG. 6 provides a plan view of a sixth embodiment of the present invention.

Shown in FIG. 6 is an embossed pattern 600 with the plurality of embossed regions 610 having a generally hexagonal shape. One of the hexagonal shapes is indicated by dashed lines A in FIG. 6, which is shown for reference only and forms no structure of the disclosed invention. Each embossed region 610 is defined by nine parallel and adjacent linear embosses 630. The two opposing vertically extending sides of each embossed region 610 are defined by three middle adjacent parallel linear embosses 630 with equal length; each vertical side of the hexagon formed by adjacent ends of the three linear embosses 630. Each of the other four diagonal sides of the hexagon are defined by an end point of an outer emboss of the three middle adjacent linear embosses 630 and adjacent end points of three other outer adjacent linear embosses 630 with each of the three other adjacent linear embosses 630 decreasing in length the same amount as the adjacent linear emboss 630.

Unlike the hexagonal shaped regions of FIG. 2, the hexagonal shaped embossed regions 610 of FIG. 6 are oriented such that vertices of each hexagon are at a bottom and top of each hexagon. As shown in FIG. 6, adjacent to the upper and lower vertices are two short opposing, linear embosses 630 at each end of each embossed region 610. Although it would be advantageous for these two embossments to have a shorter length that approaches a singular point, so as to maximize stretch, it has been observed that very short linear embosses creates a force concentration on the film and may significantly degrade properties of the film, such as impact resistance. Hence, these lower and upper embossments 630 have a certain amount of length to prevent a substantial degradation in impact resistance.

The orientation of the hexagonal shaped embossed regions 610 of FIG. 6 allows the thermoplastic film to expand in the vertical direction to a greater extent than the hexagonal shaped embossed regions 210 of FIG. 2. Nonetheless, due to the hexagonal shape of its embossed regions 610, the depicted embodiment maintains features to prevent tear propagation, as previously discussed regarding the hexagonal shape of FIG. 2.

Due to the hexagonal shape of the sixth embodiment, FIG. 6 further depicts the unembossed arrangement 620 having a plurality of first segments 620a, a plurality of second segments 620b, and a plurality of third segments 620c. Each embossed region 610 is bounded by two first segments 620a, two second segments 620b, and two third segments 620c. Each first segment 620a extends in a first direction that is generally vertical. Each second segment 620b extends in a second direction that is oblique to the first direction. Each third segment 620c extends in a third direction that is oblique to both the first direction and the second direction. The first, second, and third directions are all distinct from each other. As shown in FIG. 6, each of the segments 620a, 620b, or 620c are interrupted by an adjacent embossed region 610, failing to extend past more than one embossed region 610.

As further shown in FIG. 6, the first segments 620a intersect both the second segments 620b and third segments 620c. Furthermore, a first segment 620a, a second segment 620b, and a third segment 620c all intersect each other adjacent to both the upper and lower vertices of each embossed region 610. In a particular embodiment, the angle formed by each intersection by a first segment 620a with a second segment 620b or third segment 620c can be approximately 54 degrees or the supplementary angle of 126 degrees. In the same embodiment, the angle formed by each intersection of a second segment 620b with a third segment 620c can be approximately 108 degrees.

Figure 7:
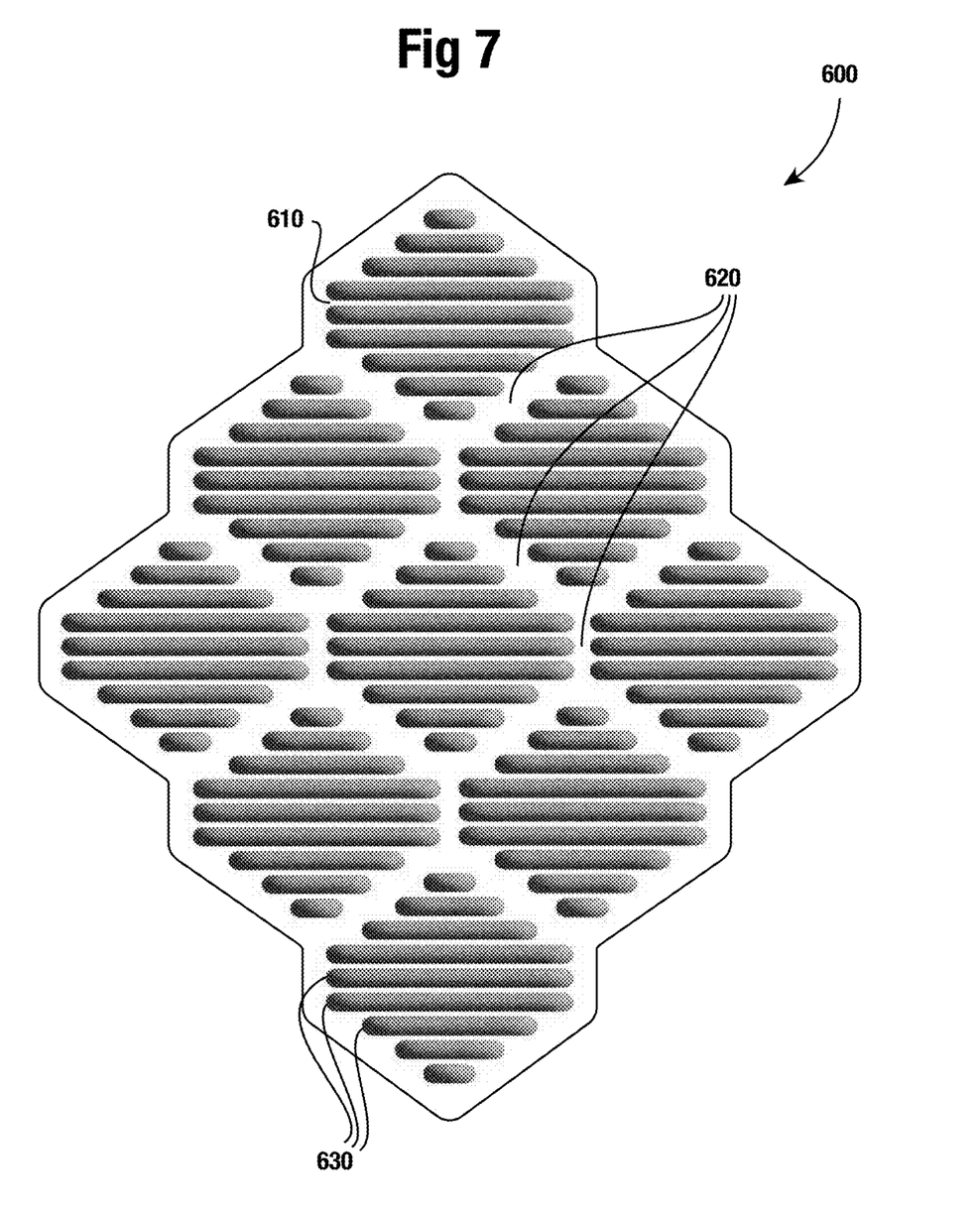
FIG. 7 provides a plan view of a section of thermoplastic film comprising the sixth embodiment of the present invention.

Shown in FIG. 7 is another view of the embossed film pattern 600 as it may generally be formed on a web of thermoplastic film, showing in more detail the shape of each linear emboss 630, in a preferred embodiment. As previously discussed, the corners of each linear emboss 630 is rounded so that each embossed region 610 has rounded corners, in general. Also illustrated is the unembossed arrangement 620.

Figure 8:
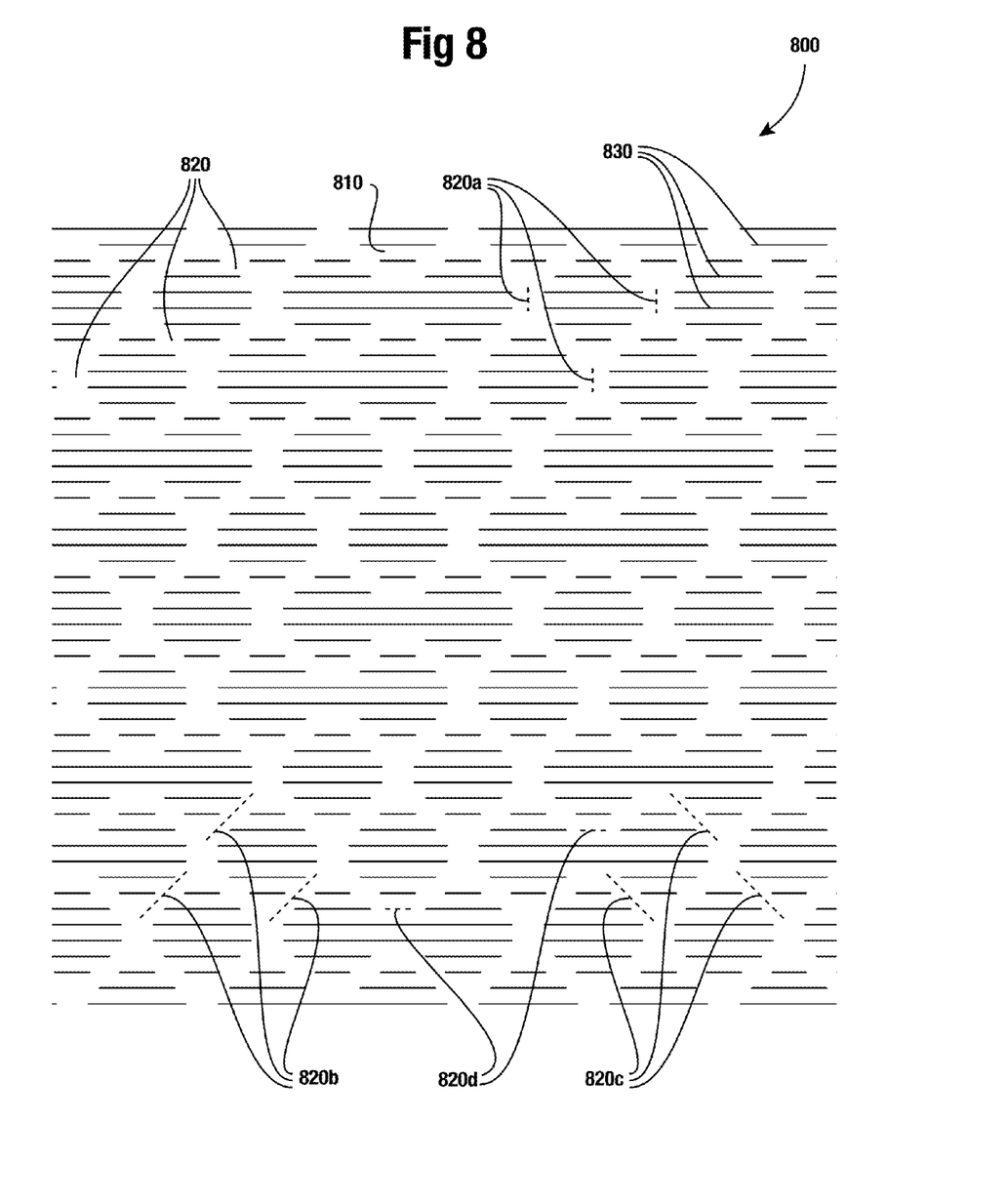
FIG. 8 provides a plan view of a seventh embodiment of the present invention.

Shown in FIG. 8 is a seventh embodiment of the present invention. The seventh embodiment has embossed regions 810 in the shape of a hexagon forming an embossed pattern 800. In a similar fashion to FIG. 4, some of the embossed regions 810 are connected to adjacent embossed regions. As shown in FIG. 8, each embossed region has six parallel linear embosses 830 that define each embossed region 810. Located at a midpoint of each embossed region are two adjacent linear embosses 830 of equal length that define opposing vertical sides of each embossed region 810. For certain horizontally adjacent embossed regions 810, these two adjacent linear embosses 830 extend to a horizontally adjacent embossed region to connect the two adjacent embossed regions 810 together. These connected adjacent embossed regions 810 may provide further assistance in preventing the propagation of tears in the film as previously discussed.

The unembossed arrangement 820 of the seventh embodiment includes a plurality of first segments 820a, a plurality of second segments 820b, and a plurality of third segments 820c. Each first segment 820a extends in a first direction that is generally vertical. Each second segment 820b extends in a second direction that is oblique to the first direction 820a. Each third segment 820c extends in a third direction that is oblique to both the first direction 820a and the second direction 820b. Additionally, the seventh embodiment has a plurality of fourth segments 820d that extend in a fourth direction. The fourth direction is generally horizontal and intersects the second and third segments 820b, 820c at oblique angles.

Figure 9:
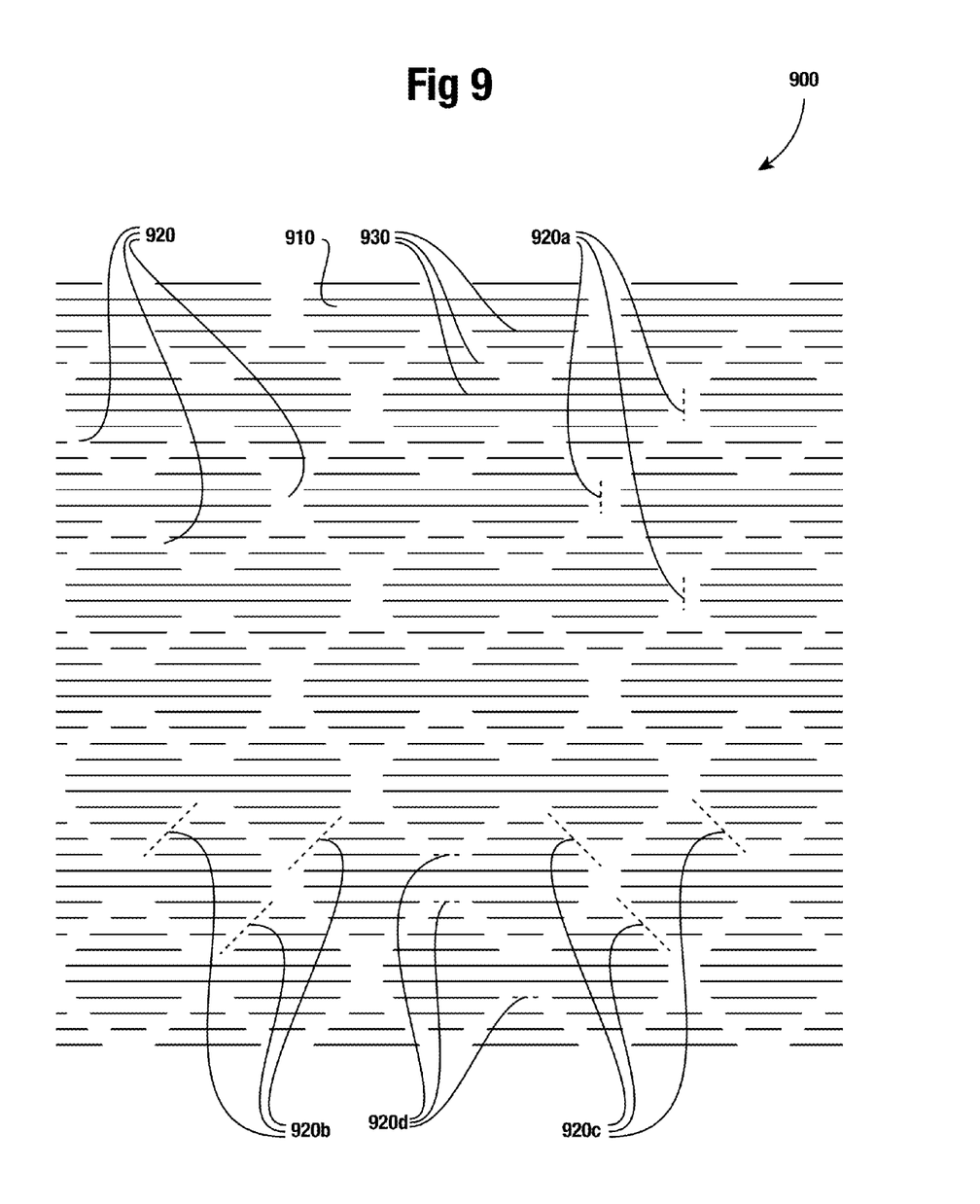
FIG. 9 provides a plan view of an eighth embodiment of the present invention.

Shown in FIG. 9 is an eighth embodiment of the present invention with an embossed pattern 900. The eighth embodiment has embossed regions 910 in the shape of a hexagon. Rather than only certain adjacent embossed regions being connected, each embossed region is connected to an adjacent embossed region, except at the boundaries of the embossed pattern 900. Each embossed region is shown with eight parallel linear embosses 930 that define each embossed region 910. Located in a vertical midpoint of each embossed region are two adjacent linear embosses 930 of equal length that define opposing vertical sides of each embossed region. For each adjacent embossed region 910, these two adjacent linear embosses extend to a horizontally adjacent embossed region 910 to connect the two adjacent embossed regions together. These connected adjacent embossed regions may provide further assistance in preventing the propagation of tears in the film by interrupting any straight-line paths between adjacent embossed regions 910.

The unembossed arrangement 920 of the eighth embodiment includes a plurality of first segments 920a, a plurality of second segments 920b, a plurality of third segments 920c, and a plurality of fourth segments 920d. Each first segment 920a extends in a first direction that is generally vertical. Each second segment 920b extends in a second direction that is oblique to the first direction 920a. Each third segment 920c extends in a third direction that is oblique to both the first direction 920a and the second direction 920b. The plurality of fourth segments 920d extend in a horizontal fourth direction and intersects the second and third segments 920b, 920c at an oblique angle. The first, second, third, and fourth directions are all distinct from each other.

Figure 10:
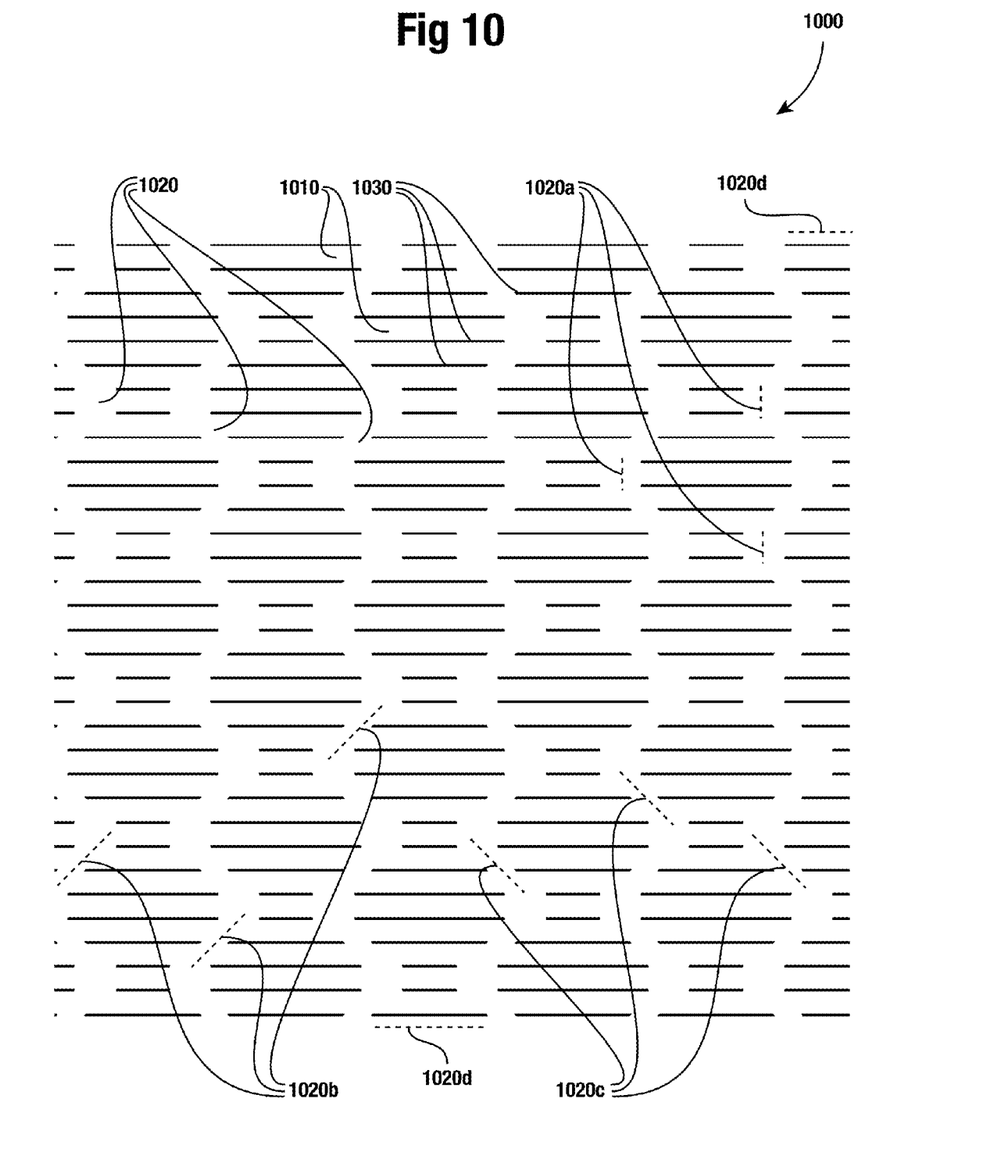
FIG. 10 provides a plan view of a ninth embodiment of the present invention.

Shown in FIG. 10 is a ninth embodiment of the present invention. Unlike the previous embodiments, FIG. 10 shows, in general, a plurality of vertically connected hexagonal shapes, forming a plurality of serpentine or bead shaped embossed regions 1010. Each embossed region 1010 extends an entire vertical distance of the embossed pattern 1000. The unembossed arrangement 1020 must extend to the perimeter of the embossed pattern 1000 to completely bound each embossed region 1010. As in the previous embodiments, the continuous, unembossed arrangement 1020 does not provide any location where a continuous, straight line can be drawn across the arrangement 1020.

The unembossed arrangement 1020 of the ninth embodiment includes a plurality of first segments 1020a, a plurality of second segments 1020b, a plurality of third segments 1020c, and a plurality of fourth segments 1020d. Each first segment 1020a extends vertically in a first direction. Each second segment 1020b extends in a second direction that is oblique to the first direction 1020a. Each third segment 1020c extends in a third direction that is oblique to both the first direction 1020a and the second direction 1020b. The plurality of fourth segments 1020d extends horizontally in a fourth direction. The plurality of fourth sections is defined only about the perimeter of the pattern, intersecting the second segments 1020b and third segments 1020c at oblique angles or the first segments 1020a at right angles. As shown, first segments 1020a intersect both second segments 1020b and third segments 1020c. In a particular example, each of these intersections can form an angle of approximately 37 degrees, or the supplementary angle of approximately 143 degrees. The fourth segments 1020d also intersect both the second and third segments 1020b, 1020c at an angle of approximately 37 degrees and the first segments 1020a at ninety degrees.

In at least one embodiment, the bead pattern of FIG. 10 can extend in a cross direction of a blown film. Hence, any tear propagating in the weaker machine direction of the film would expect to be interrupted by the bead pattern. In alternative embodiment, the bead pattern may extend in the machine direction. If a tear then propagates in the film, it is expected that one of the linear embosses will interrupt the tear before it propagates and redirect it into the cross direction.

As previously noted, the specific embodiments depicted herein are not intended to limit the scope of the present invention. Indeed, it is contemplated that any number of different embodiments may be utilized without diverging from the spirit of the invention. Therefore, the appended claims are intended to more fully encompass the full scope of the present invention.

I claim:
1. An embossed pattern of thermoplastic film comprising:
a plurality of embossed regions embossed into the thermoplastic film, the plurality of embossed regions separated by a continuous, unembossed arrangement,
each of the plurality of embossed regions comprising a set of parallel, linear embosses and each embossed region defined by a boundary with the continuous, unembossed arrangement,
the continuous, unembossed arrangement comprising at least a plurality of first segments, a plurality of second segments, and a plurality of third segments,
the plurality of first segments extending in a first direction, the plurality of second segments extending in a second direction, the plurality of third segments extending in a third direction, and the first, second, and third directions distinct from each other.

2. The embossed pattern of claim 1, further comprising: each set of parallel, linear embosses parallel to every other set of parallel, linear embosses.

3. The embossed pattern of claim 1, further comprising: a majority of the plurality of embossed regions are irregularly shaped.

4. The thermoplastic film of claim 1, further comprising: each set of parallel linear embosses having at least eight embosses.

5. The embossed pattern of claim 1, further comprising: a majority of the plurality of embossed regions are hexagon-shaped.

6. The embossed pattern of claim 5, further comprising: the first direction generally vertical.

7. The embossed pattern of claim 6, further comprising: the second direction oblique to the first direction and the third direction.

8. The embossed pattern of claim 7, further comprising: the first direction oblique to the second direction and the third direction.

9. The thermoplastic film of claim 5, further comprising: a first segment, a second segment, and a third segment intersecting at both a first vertex and a second vertex of each of the plurality of embossed regions, the first vertex opposite the second vertex.

10. A thermoplastic bag comprising:
a first panel and a second panel, the first panel and the second panel joined along a first side edge, a second side edge, and a bottom edge, a top edge of the first panel and the second panel defining an upper opening of the bag,
a plurality of embossed regions embossed into the first panel and the second panel, the plurality of embossed regions separated by a continuous, unembossed arrangement,
each of the plurality of embossed regions comprising a plurality of parallel, linear embosses and each embossed region defined by the continuous, unembossed arrangement,
the continuous, unembossed arrangement comprising at least a plurality of first segments, a plurality of second segments, and a plurality of third segments,
the plurality of first segments extending in a first direction, the plurality of second segments extending in a second direction, the plurality of third segments extending in a third direction, and
the first direction, second direction, and third direction distinct from each other.

11. The thermoplastic bag of claim 10, further comprising: the plurality of parallel, linear embosses of each plurality of embossed regions parallel to each other.

12. The thermoplastic bag of claim 10, further comprising: a majority of the plurality of embossed regions are irregularly shaped.

13. The thermoplastic bag of claim 10, further comprising: a majority of the plurality of embossed regions are hexagon-shaped.

14. The thermoplastic bag of claim 10, further comprising: each of the plurality of the embossed regions comprising at least eight parallel linear embosses.

15. The thermoplastic bag of claim 10, further comprising: the first direction, second direction, and third direction oblique to each other.

16. An embossed pattern of thermoplastic film comprising:
a plurality of embossed regions embossed into the thermoplastic film, wherein the plurality of embossed regions are separated by a continuous, unembossed arrangement,
each of the plurality of embossed regions comprising a set of parallel, linear embosses and each embossed region defined by a boundary with the continuous, unembossed arrangement,
the continuous, unembossed arrangement only bounding each embossed region at a perimeter of the embossed pattern.

17. The embossed pattern of claim 16 further comprising:
the continuous, unembossed arrangement comprising at least a plurality of first segments, a plurality of second segments, and a plurality of third segments,
the plurality of first segments extending in a first direction, the plurality of second segments extending in a second direction, the plurality of third segments extending in a third direction, and
the first direction, the second direction, and the third direction distinct from each other.

18. The embossed pattern of claim 16 further comprising: each of the plurality of embossed regions having a serpentine shape.

19. The embossed pattern of claim 17 further comprising: the continuous, unembossed arrangement comprising a plurality of fourth segments, the fourth segments extending in a fourth direction distinct from the first, second and third directions.

20. The embossed pattern of claim 19 further comprising: the first direction generally vertical and the fourth direction generally horizontal.

* * * * *